T. A. DICKINSON.
METERING DEVICE.
APPLICATION FILED NOV. 22, 1920.
1,396,560.
Patented Nov. 8, 1921.
2 SHEETS—SHEET 1.
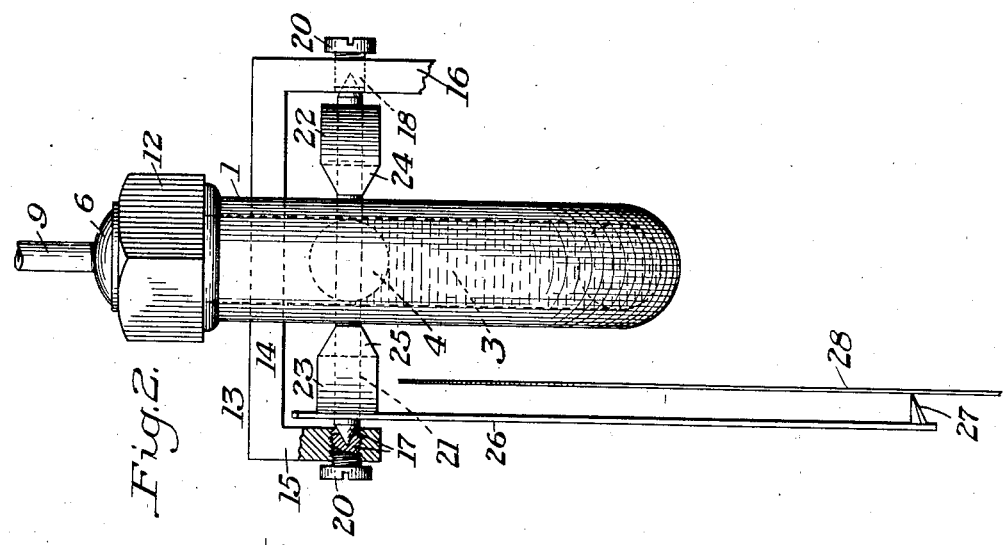
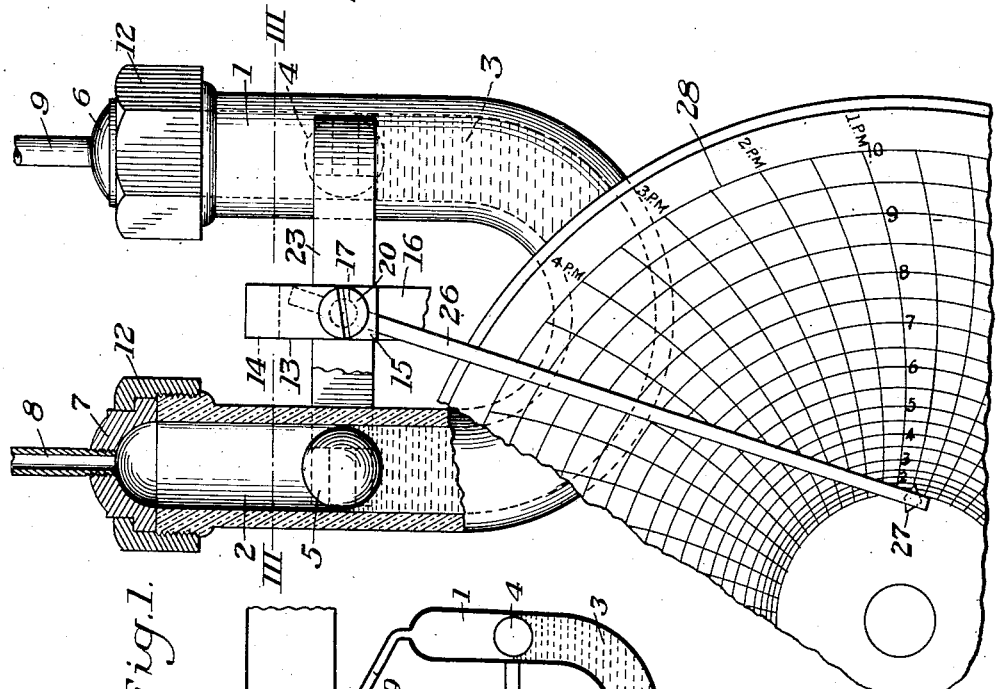
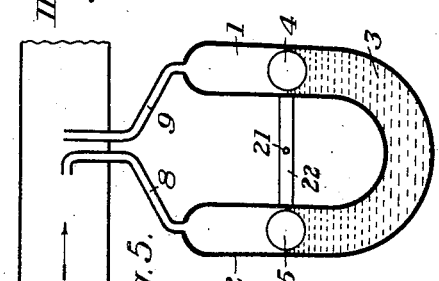
Inventor
Thomas A. Dickinson
by Bakewell, Byrnes & Parmelee
his Attorneys T. A. DICKINSON.
METERING DEVICE.
APPLICATION FILED NOV. 22, 1920.
1,396,560.
Patented Nov. 8, 1921.
2 SHEETS—SHEET 2.
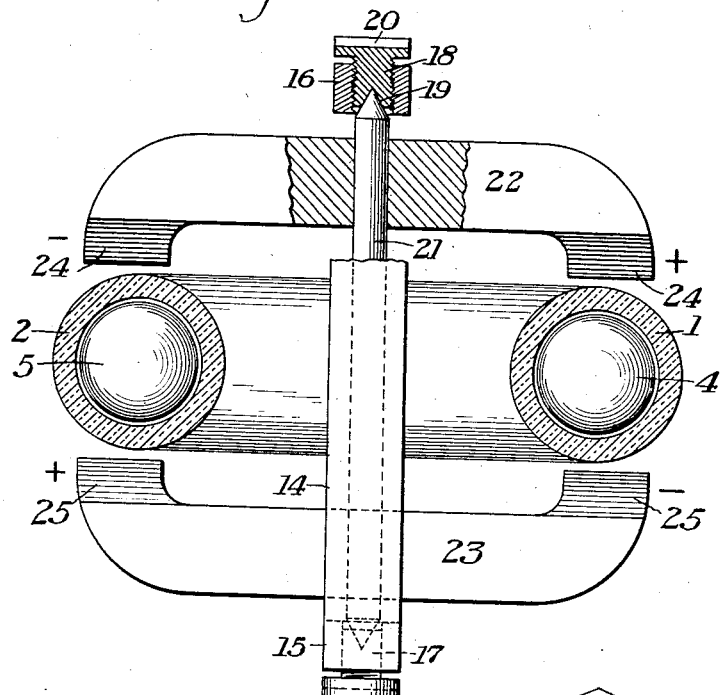
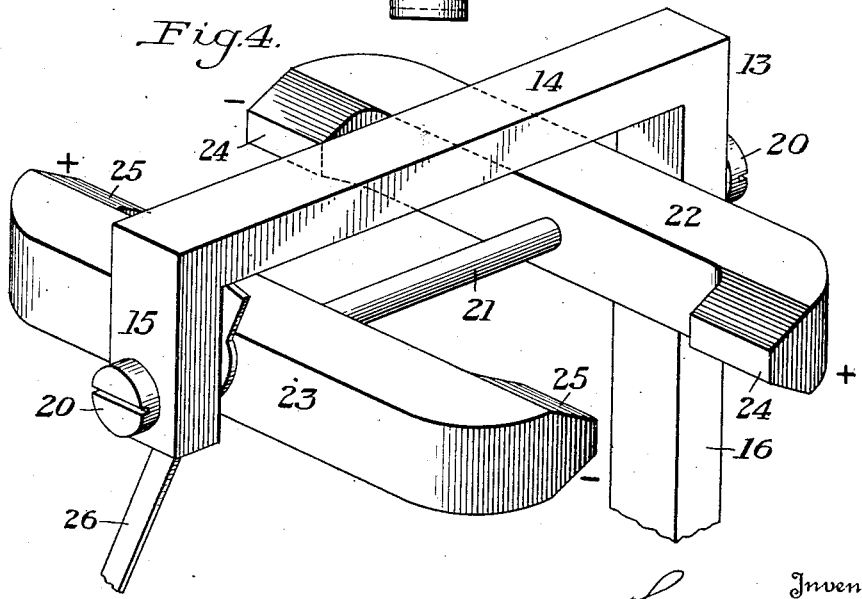

UNITED STATES PATENT OFFICE.

THOMAS A. DICKINSON, OF YOUNGSTOWN, OHIO.

METERING DEVICE.

1,396,560.     Specification of Letters Patent.     Patented Nov. 8, 1921.

Application filed November 22, 1920. Serial No. 425,615.

*To all whom it may concern:*

Be it known that I, THOMAS A. DICKINSON, a resident of Youngstown, in the county of Mahoning and State of Ohio, have invented a new and useful Improvement in Metering Devices.

My invention relates to a metering device, and particularly to a flow meter ordinarily used for the purpose of measuring the flow or rate of flow of fluids, either gaseous or liquid, through a pipe.

An object of my invention is to devise a means of the above character which is simple in construction and accurate and reliable in operation. In my particular device, the connection between the internal mechanism and the external mechanism is a magnetic one, thus avoiding all question of friction in the transmission of the actuating force to the indicating or recording mechanism.

Further objects and advantages of my invention will be apparent from reading the following description, taken in connection with the accompanying drawings, in which:

Figure 1 is a side elevation partly in section of a device embodying my invention;

Fig. 2 is a side elevation partly in section of the device shown in Fig. 1;

Fig. 3 is a cross section on the line III—III of Fig. 1, with the indicating means removed;

Fig. 4 is a perspective view of part of the outside mechanism; and

Fig. 5 is a diagrammatic view on a small scale showing the connection of the instrument for normal operation.

Referring to the drawings, my invention consists of a U-tube of substantially non-magnetic material having a leg 1 and a leg 2. The legs of this tube are turned upwardly as shown in Fig. 1. This tube is filled with a liquid 3, heavy enough to support floats 4 and 5, which are of magnetic material which may be either solid or hollow. A suitable liquid for this purpose is mercury. The upper ends of the legs 1 and 2 of the U-tube are threaded. Fitted over the top of each of the legs 1 and 2 is a semi-spherical seat 6 and 7, respectively. The object of this is to permit the floats to seal the pipes 8 and 9, which are screw-threaded into the seats 6 and 7, respectively, in order to prevent the escape of the mercury or other fluid 3, due to an excess of pressure on one leg with respect to that on the other.

The seats 6 and 7 are held in place by nuts 12, which are screwed on the ends of the legs and have inturned upper portions engaging the seats and clamping the same firmly against the ends of the legs.

The pipes 8 and 9 are connected to any well known device for creating a differential pressure in the legs 1 and 2 of the tube proportional to the rate of flow of the fluid being measured. A convenient form of such a device is a Pitot plug, the action of which is well understood and need not be described. For the purpose of illustrating my invention, however, let it be understood that the leg 2 is connected with the high pressure tube of the Pitot plug, and the leg 1 is connected to the low pressure tube.

A fixed support 13, as shown in Fig. 4, has a horizontal portion 14, which extends between the legs of the tube and a vertical portion 15. The upright portions 15 and 16 of the support 13 are provided with bearings 17 and 18, one of which is shown in section in Fig. 3. These bearings comprise a screw portion having a conical recess 19, in the end thereof, and a head 20 thereon. They are screwed into the portions 15 and 16, respectively, of the support 13. A spindle or shaft 21 has conical shaped ends, which are placed in the corresponding recesses 19, and which spindle is supported by the bearings. Mounted on the spindle 21 are two magnets 22 and 23. These magnets have reduced end portions 24 and 25, respectively. They are placed so that the north pole of one magnet is opposite the south pole of the other, as represented by the plus and minus signs shown in Figs. 3 and 4. The amount of fluid 3 in the U-tube is such as to bring the floats 4 and 5 between the opposing ends of the magnets, as shown in Fig. 1. The magnetic path between the magnets is therefore completed through the floats 4 and 5, which are of magnetic material. Also fastened upon the spindle 21 is an arm 26. This arm may be provided with a stylus 27, which engages a suitable recording disk 28, so as to leave a permanent record of the variations therein, as will be explained presently.

If the device above described is used for a liquid such as water or a condensable fluid, such as steam, the space in the legs 1 and 2 of the tube will soon become filled with water above the mercury, and in selecting the material of which the floats 4 and 5 are made, this should be taken into consideration, especially if the device is to be used for the measurement of a condensable gaseous fluid or a liquid. The consideration in question would be the effect which the presence of the liquid in the chamber above the mercury would have upon the floats.

In operation, my device is connected up, as shown in Fig. 5, whereupon the differential pressure created by the flow of fluid through the pipe 11 would cause the float 5 to be lowered, and the float 4 correspondingly raised, which will have the effect of rotating the indicator 26, as shown in Fig. 1, in a counterclockwise direction. This rotation is caused by the fact that the float 5 is lowered and the float 4 correspondingly raised which, through the magnetic lines of force passing from the magnet 24 to the magnet 25, rotates the magnets 24 and 25 and the spindle 21 in the bearings 17 and 18. The reduced end portions of the magnets concentrate the magnetic flux, and therefore, render the magnets more sensitive and responsive to the movement of the floats 4 and 5. A change of value of the differential pressure will cause a corresponding change of the floats, and through them and the magnets, a change in the position of the indicator 26.

From the foregoing, it will be evident that the device which I have devised is extremely simple, is rugged, is substantially free from friction, and is therefore extremely accurate in its indications and records.

I claim:

1. In a metering device, the combination of an agent for creating a differential pressure proportional to the rate of flow of the fluid being measured, a pivotally supported member, means for moving said member comprising magnetic members responsive to said differential pressure, and magnetic means responsive to said first magnetic members, substantially as described.

2. In a metering device, the combination of an agent for creating a differential pressure proportional to the rate of flow of the fluid being measured, a pivoted indicator member, a tube connected to said agent, a magnetic member in said tube and responsive to said differential pressure, and a magnet actuated by said magnetic member and actuating said indicator member, substantially as described.

3. In a metering device, the combination of an agent for creating a differential pressure proportional to the rate of flow of the fluid being measured, an indicator member, a stationary substantially non-magnetic tube, two floats therein of magnetic material and freely responsive to the differential pressure created in said tube, and a pivoted magnet in coöperative relation with said floats and actuated thereby, substantially as described.

4. In a metering device, the combination of an agent for creating a differential pressure proportional to the rate of flow of the fluid being measured, a pivoted indicator, a substantially non-magnetic U tube, a liquid in said tube, two floats of magnetic material, one in each leg of said tube, and two pivoted magnets oppositely arranged and positioned with their ends opposite said floats and connected with said indicator, substantially as described.

5. In a metering device, the combination of an agent for creating a differential pressure proportional to the rate of flow of the fluid being measured, a pivoted indicator, two magnets pivoted substantially at their middle point and having reduced ends, the said ends of the magnets being placed opposite each other and spaced apart and being of opposite polarity, and magnetic members responsive to the differential pressure and controlling said indicator, substantially as described.

6. In a metering device, the combination of an agent for creating a differential pressure proportional to the rate of flow of the fluid being measured, a pivoted member, magnetic members directly responsive to said differential pressure, a magnet freely movable with said magnetic members and connected to said pivoted member, and means whereby the movements of said pivoted member are recorded, substantially as described.

7. In a metering device, the combination of an agent for creating a differential pressure proportional to the rate of flow of the fluid being measured, a pivotally supported member, means for moving said member comprising magnetic members responsive to said differential pressure, and means whereby the movements of said pivotally supported member are recorded, substantially as described.

In testimony whereof I have hereunto set my hand.

T. A. DICKINSON.